United States Patent [19]

Barentsen et al.

[11] Patent Number: 5,166,446

[45] Date of Patent: Nov. 24, 1992

[54] PROCESS FOR THE PREPARATION OF POLYARYLENE SULFIDE HAVING A LOW ALKALIMETAL CONTENT

[75] Inventors: Willem M. Barentsen; Petrus F. Beuker; Johannes M. L. Penninger, all of Hengelo, Netherlands

[73] Assignee: Akzo nv, Arnhem, Netherlands

[21] Appl. No.: 724,693

[22] Filed: Jul. 2, 1991

[30] Foreign Application Priority Data

Jul. 5, 1990 [NL] Netherlands ............... 9001526

[51] Int. Cl.$^5$ ............................. C07C 319/22
[52] U.S. Cl. ........................................ 568/56
[58] Field of Search ........................... 568/56

[56] References Cited

U.S. PATENT DOCUMENTS 4,029,706 6/1977 Crosby ........................ 568/6
4,734,484 3/1988 Alfes et al. ................. 528/502

FOREIGN PATENT DOCUMENTS 247647 10/1963 Australia .
0096384 12/1983 European Pat. Off. .
0202537 11/1986 European Pat. Off. .
0220490 5/1987 European Pat. Off. .
0242617 10/1987 European Pat. Off. .

OTHER PUBLICATIONS

Derwent Abstract; 90-027311/04; Toray Ind. Inc.; Dec. 11, 1989.

Primary Examiner—Marianne M. Cintins
Assistant Examiner—Michael B. Hydorn
Attorney, Agent, or Firm—Richard P. Fennelly; Louis A. Morris

[57] ABSTRACT

Polyarylene sulfide having a much reduced content of impurities is prepared by reacting an aromatic polyhalide with an alkali metal sulfide in the presence of a polar organic solvent and subjecting the resulting polyarylene sulfide subsequently to an acid treatment, filtration through a screen having a mesh size of 50–100 $\mu$, and washing with, successively, the same solvent as used in the preparation of the polymer, water, an organic or inorganic acid, and water. The resulting polyarylene sulfide has a sodium content of less than 20 ppm.

7 Claims, No Drawings

PROCESS FOR THE PREPARATION OF POLYARYLENE SULFIDE HAVING A LOW ALKALIMETAL CONTENT

The present invention relates to a process for the preparation of polyarylene sulfide having a low alkali metal content, which process comprises converting an aromatic polyhalide to a polyarylene sulfide using an alkali metal sulfide in the presence of a polar organic solvent with the resulting polyarylene sulfide being subsequently treated with an acid, and then filtered, washed, and dried, to yield a polyarylene sulfide having a low alkali metal content.

A description of a process for the preparation of polyarylene sulfide having a low alkali metal content is provided in, European Pat. Publ. No. 242,617. According to the process described in this patent document a slurry of polyarylene sulfide, such as polyphenylene sulfide, is treated with an inorganic or organic acid at a pH of the slurry of not higher than 6 and is filtered. The filter cake is then washed with water and dried. Although it is possible to obtain a polyarylene sulfide having a sodium content of 28 ppm using such a process, in actual commercial practice there is a great need for a process with which polyarylene sulfides having a still lower alkali metal content. The present invention now provides a process in which the above-mentioned drawback is wholly or partly obviated and which allows for the production of a polyarylene sulfide having an alkali metal content of less than 20 ppm. The present invention is a process of the known type mentioned in the opening paragraph in which, on conclusion of the reaction, the reaction mixture is filtered through a screen having a mesh size of 50–100 $\mu$ and the filtered product washed with, successively, the same solvent as used in the preparation of the polymer, water, an organic or inorganic acid, and water.

It should be noted that in the Derwent abstract of Japanese Pat. Publ. No. 1,306,426 a process for the preparation of polyarylene sulfide is described in which, after preparation, the polyarylene sulfide is washed and filtered. In an example contained in that patent publication, a polyphenylene sulfide having an alkali metal content of 21 mg sodium/kg of polymer is described as being obtained. A major difference between this treatment and the one presently proposed is that the known process starts out with washing with water. This results in objectionable oligomers being precipitated on the polymer. To remove these undesired oligomers a washing step with hot N-methyl-2-pyrrolidone is needed after an expensive drying step. A further drawback to the process described in this Japanese reference is that when a polymerization affecting compound is employed, such as sodium acetate, it will end up wholly in the washing water, from which it is difficult to remove. This is also the case with the acetic acid used in the washing treatment. The employing of an additional drying step, an intricate process for regenerating the organic solvent, and a laborious process for purifying the washing water render this known process less suitable for use on a commercial scale than in a laboratory sized experiment.

European Pat. Publ. No. 202,537 also describes a process for the preparation of polyarylene sulfide in which, after having been filtered through a screen having a mesh size of 50–500 $\mu$, the polyarylene sulfide, in addition to being washed with water, is washed with an organic solvent, with preference being given to acetone and methanol. A drawback to the use of the organic solvents proposed in this patent document is that they fail to dissolve the oligomers present in the polymer, are mixed with the solvent used in preparing the polymer, and subsequently may be left therein in the form of traces even after purification, which is objectionable if the solvent is to be re-used in the polymerization reaction.

Also in European Pat. Publ. No. 220,490 there is question of a process for preparing polyarylene sulfide having a very low inorganic salt content can be accomplished. In contradistinction to what takes places in the process according to the present invention, the reaction mixture described in this patent document is filtered at a temperature of at least 180° C. The result of this step is that only the inorganic salt is filtered from the reaction mixture, while the polyarylene sulfide, which is precipitated on cooling down, is contaminated with oligomer, which has a negative effect on the physical properties of the end product In the process described in European Pat. Publ. No. 96,384, polyarylene sulfide is washed and screened after preparation. The washing treatment is carried out exclusively with water in three stirred vessels having a separator in the form of a screen/lattice. A drawback to this treatment vis-a-vis the one presently proposed is that all of the organic solvent ends up in the wash water, which will impede effective recycling of the solvent. Moreover, the polyarylene sulfide will easily be contaminated with oligomer, which is precipitated as soon as water is added to the polyarylene sulfide-containing slurry. A further drawback to the process described in this patent document is that when use is made of a polymerization-affecting compound such as sodium acetate, it will also wholly end up in the wash water, from which it is hard to remove. Further, there is also no indication in this patent publication of a treatment with acid. The lowest alkali metal content listed in the examples in this patent document is 275 mg of sodium/kg of polyphenylene sulfide. In the process according to the invention it is of great importance that a screen is utilized which has a mesh size as indicated above. A screen size variation downwards will result in an increase in undesired alkali metal halide and undesired oligomer, while a screen size variation upwards will lead to a reduced yield of the desired end product. The wash treatment with a polar organic solvent that comes immediately after filtration is also of great importance as regards the purity of the end product. If the washing of the slurry immediately after cooling is carried out with water, it will result in a substantial increase in undesired alkali metal halide and undesired oligomer in the end product. Furthermore, the treatment of the resulting used wash liquor will be made unnecessarily complex. Another condition for attaining a polyarylene sulfide having an exceptionally low alkali metal content is the treatment with acid.

The process according to the present invention may be used in the preparation of any polyarylene sulfide obtained by conversion of an aromatic polyhalide with an alkali metal sulfide in the presence of a polar organic solvent, in which process there is obtained a reaction mixture composed of molten polyarylene sulfide, a polar organic solvent, various impurities, and unconverted reaction constituents. The impurities are usually made up of alkali metal halides and polyarylene sulfide oligomers, which are gelatinous and which are generally referred to as "slime". By taking care in the preparative process that at least those parts of the apparatus which may come into contact with the reaction mixture are manufactured from or are coated with materials suitable for this purpose, yet more impurities may be prevented from forming. Examples of suitable materials include zirconium, tantalum, and noble metals such as platinum and rhodium. Surprisingly, however, it has been found that a pure product can also be obtained with the use of less expensive construction materials such as Avesta 254 SMO (UNS S31254) and/or Inconel Alloy 625 (Wstnr. 2.4856).

According to the present invention particularly favorable results are obtained in preparing polyphenylene sulfides. These are obtained by reacting at least one p-dihalobenzene under the polymerization conditions indicated below in the presence of at least one alkali metal sulfide or other sulfur source and polar organic solvent, usually in the presence of a small amount of a polyhalo aromatic compound having more than two halogen substituents per molecule, and/or a polymerization affecting compound, such as an alkali metal carboxylate or a lithium halide. Examples of p-dihalobenzenes which according to the invention are suitable for use in the preparation of polyphenylene sulfide are those which contain at the respective para positions a halogen atom such as chlorine, bromine, or iodine, and which contain at each of the other four positions on the phenyl ring an "R" group which can be a hydrogen atom or a hydrocarbon group, such as an alkyl group, cycloalkyl group, or aryl group, or a combination thereof such as aralkyl and alkaryl, the total number of carbon atoms in each molecule ranging from 6 to 24, with the proviso that in at least 50 mole% of the used p-dihalobenzene the R group is a hydrogen atom. As examples of some p-dihalobenzenes that can be used according to the invention may be mentioned: p-dichlorobenzene, p-dibromobenzene, p-diiodobenzene, 1-chloro-4-bromobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-(p-tolyl)-2,5-dibromobenzene, 1-benzyl-2,5-dichlorobenzene, 1-octyl-4-(3-methylcyclopentyl)-2,5-dichlorobenzene, and mixtures thereof.

Polyhalo aromatic compounds having more than two halogen substituents per molecule that may be used according to the invention can be represented by the formula $R'X'_n$, wherein $X'$ has the meaning of chlorine or bromine, preferably chlorine, n is an integer in the range of 3 to 6, and $R'$ stands for a polyvalent aromatic group of valence n which may be substituted with at most 4 methyl groups and has a number of carbon atoms ranging from 6 to 16.

Examples of some polyhalobenzenes with more than two halogen substituents in the ring that can be used according to the invention include: 1,2,3-trichlorobenzene, 1,2,4-trichlorobenzene, 1,3-dichloro-5-bromobenzene, 2,4,6-trichlorotoluene, 1,2,3,5-tetrabromobenzene, hexachlorobenzene, 1,3,5-trichloro-2,4,6-trimethylbenzene, 2,2', 4,4'-tetrachlorobiphenyl, 1,2,3,4-tetrachloronaphthalene, and 1,2,4-tribromo-6-methylnaphthalene.

Alkali metal sulfides that can be employed according to the invention include lithium sulfide, sodium sulfide, potassium sulfide, rubidium sulfide, cesium sulfide, and mixtures thereof. Preferably, the alkali metal sulfide is used as a hydrate or as an aqueous mixture. If desired, the alkali metal sulfide can be prepared as an aqueous solution by the reaction of an alkali metal hydroxide with an alkali metal bisulfide in an aqueous medium.

According to the invention use is preferably made of an alkali metal carboxylate of the formula $R''CO_2M$, wherein $R''$ has the meaning of a hydrocarbon group, such as alkyl, cycloalkyl, and aryl, and combinations thereof such as alkaryl and aralkyl, having 1–20 carbon atoms, and M represents an alkali metal. As suitable alkali metals can be mentioned sodium, potassium, rubidium, and cesium. Optionally, the metal carboxylate may be present as a hydrate or as a solution or dispersion in water. Examples of suitable metal carboxylates include lithium acetate, sodium acetate, potassium acetate, lithium propionate, rubidium butyrate, lithium heptanoate, sodium valerate, 2-methyloctanoate, sodium benzoate, potassium m-toluate, potassium p-tolyl acetate, and lithium benzoate, as well as mixtures of these salts. The amount of metal carboxylate to be used generally ranges from 0.05 to 4 gram-moles of carboxylate/gram-mole of p-dihalobenzene.

When a lithium halide is employed, preference is given to lithium chloride, lithium bromide, lithium iodide, and mixtures thereof.

The polar organic solvents useful in the present invention are solvents for the polyhalo aromatic compounds and the alkali metal sulfides used in the preparation of arylene sulfide polymers. Examples of suitable polar solvents include: amides, including lactams, and sulfones. As specific examples may be mentioned hexamethyl-phosphoramide, tetramethyl urea, N,N'-ethylene dipyrrolidone, N-methyl-2-pyrrolidone, pyrrolidone, caprolactam, N-ethyl caprolactam, sulfolane, and N,N'-dimethyl acetamide. According to the invention preference is given to the use of N-methyl-2-pyrrolidone (NMP), since this solvent is also especially suitable as wash liquor for the finished polymer.

The temperature at which the reaction is carried out is generally selected in the range of from about 215° to about 315° C., preferably in the range of 225° to 285° C. The reaction period may vary within wide limits It is generally selected to be in the range of from about ten minutes to about seventy-two hours, and in actual practice will generally be in the range of one to eight hours. Employing the reaction constituents and reaction conditions indicated hereinbefore will result in there being obtained, after cooling of the reaction mixture, a slurry of polyarylene sulfide, alkali metal halide, polar organic solvent, water, and unconverted reaction constituents. The preparation in particular of commercially significant polyphenylene sulfide under the reaction conditions indicated hereinbefore will result in a coarse-grained product being obtained which, on application of the process according to the invention, can be purified into a product having an exceptionally low alkali metal content.

It has been found that, as a rule, optimum results are obtained when using a screen having a mesh size in the range of from about 65 to about 80 $\mu$, preference being given to a screen having a mesh size in the range of 70–75 $\mu$, most preferably about 71 $\mu$.

As regards the shape of the screen, the most wide-ranging structures may be employed. In actual practice, favorable results have been obtained using a vibrating screen on which three treatments are carried out successively and continuously, i.e. separation of the polyphenylene sulfide granules, sodium chloride, and oligomer, washing out with clean NMP, and, finally, draining the polyphenylene sulfide. Next, on a horizontal band filter, the polyphenylene sulfide granules are subjected to counterflow washing with water to remove the sodium chloride, after which, on a second horizontal band filter and following a treatment with hydrochloric acid, the chlorine ions are washed out, also in counterflow.

Favorable results also are obtained when the treatment with acid and water is carried out in a fixed bed column. In such a case optimum results are obtained when the filtered product is charged to the water-filled fixed bed column after having been washed with a polar organic solvent, such as NMP, and drained, whereupon the liquid phase is dispelled down-flow one or more times by water, dilute hydrochloric acid, and water. In this way a polyarylene sulfide having a sodium content of less than 20 ppm can be prepared.

The invention will now be illustrated with reference to the following Examples. It goes without saying that these embodiments of the invention are in no way intended to limit the scope thereof.

EXAMPLE 1

In a stirred tank reactor p-dichlorobenzene was converted to polyphenylene sulfide, in the presence of sodium acetate, with sodium sulfide in a small amount of water and N-methyl-2-pyrrolidone as solvent. Present per mole of sodium sulfide were: 1.015 moles of dichlorobenzene (DCB), 0.06283 mole of NaOH, 1.5 moles of $H_2O$, 0.155 mole of sodium acetate (NaOAc), and 3.5 moles of N-methyl-2-pyrrolidone (NMP).

The reaction mixture was heated to 235° C. and was kept at that temperature for 2.5 hours. It was then further heated to 265° C. over a period of thirty minutes and kept at that temperature for five hours. Subsequently, there was cooling to 210° C. and then to 100° C., with the polyphenylene sulfide crystallizing out. The reaction mixture was discharged in the form of a slurry and was subsequently filtered, first through a coarse screen deck and then through a screen having a mesh size of 71 μ. The PPS left on the screen was washed with 0.25 kg of NMP/kg of slurry, after which the still wet polymer cake was transferred to a stirred tank reactor for subsequent washing with water on a horizontal band filter composed of five sections. From here the filter cake was transferred by way of a stirred tank to a second horizontal band filter composed of four sections, on which there was further washing in counterflow with dilute hydrochloric acid and then with distilled water. After drying a PPS having an Na content of 89 ppm was obtained.

EXAMPLE 2

Having been washed with NMP, the polymer cake of Example 1 was not introduced onto a horizontal band filter this time but charged to a column filled with water. The column had a diameter of 297 mm. The bed height of the polymer granules was 1.5 m.

Next, the contents of the column were twice renewed batchwise with pure water, then, successively, twice with 0.5 wt. % of HCl, twice with 1 wt. % of Hcl, and another four times again with pure water. Following filtering off and drying a PPS was obtained which had an Na content ranging from 10.1 to 12.0 mg of sodium/kg of PPS.

The foregoing examples are set forth to illustrate certain embodiments of the present invention and, for that reason, should not be construed in a limiting sense. The scope of protection sought is set forth in the claims which follow.

We claim:

1. In a process for the preparation of polyarylene sulfide having a low alkali metal halide content, which process comprises an aromatic polyhalide being reacted with an alkali metal sulfide in the presence of a polar organic solvent with the resulting polyarylene sulfide subsequently being treated with an acid, filtered, washed, and dried, wherein the improvement comprises filtering the reaction mixture from the polymerization through a screen having a mesh size of from about 50 to about 100 μ, and washing the filtered product, successively, with said polar organic solvent, water, an organic or inorganic acid, and water.

2. A process according to claim 1, wherein the mesh size of the screen is in the range of from about 65 to about 80 μ.

3. A process according to claim 1, wherein the polar organic solvent is N-methyl-2-pyrrolidone.

4. A process according to claim 1, wherein the washing with acid and washing with water is carried out on at least one horizontal band filter.

5. A process according to claim 4, wherein sodium chloride is first washed out of the polyarylene sulfide with water in counterflow on a first horizontal band filter and, then, following washing with acid in counterflow, on a second horizontal band filter, so that chlorine ions are washed out of the polyarylene sulfide.

6. A process according to claim 1, wherein the washing with acid and water is carried out in a fixed bed column.

7. A process according to claim 6, wherein the filtered product is charged to a water-filled fixed bed column after having been washed with the polar organic solvent and drained, whereupon the liquid phase is dispensed downstream one or more times by water, dilute hydrochloric acid, and water.

* * * * *